US Patent 3,468,636 — Patented Sept. 23, 1969

3,468,636
ION EXCHANGE MATERIAL AND METHOD OF MAKING SAME
Leslie D. MacLeod, 3 Victoria Gardens, Cotham, Bristol 6, Gloucestershire, England
No Drawing. Filed Mar. 9, 1965, Ser. No. 438,388
Claims priority, application Great Britain, Mar. 12, 1964, 10,513/64
Int. Cl. G01n *31/22; 31/04*
U.S. Cl. 23—253                         3 Claims

ABSTRACT OF THE DISCLOSURE

A method of determining the concentration of microgram quantities of cations in physilogical liquids by loading the cations on to a cation exchange strip comprising a β-cellulose film which has been impregnated with Congo red dye, the loaded ions subsequently being discharged by replacement and estimated by titration.

---

This invention concerns an improved ion exchange material and method of using and making same.

In biochemical work it is frequently necessary to determine the concentration of metal cations in various physiological fluids. Such fluids may, for example, be blood or urine, and in the former case it may be necessary to determine the concentration of calcium. The samples available for analysis are usually small and thus the actual quantity of metal cation is usually in the microgram range. Therefore great care is necessary to avoid contamination and the upsetting of conditions if equilibria which may be present in the fluid.

An object of the invention is to provide a method of determining the concentration of cations using an ion exchange material of film-like form which is robust and permits freedom of manipulation. Another object of the invention is to provide an ion exchange strip which can be cleaned if required after use and re-generated and re-used. A still further object is to provide an ion exchange strip with readily accessible exchange areas to ions in solution. Another object of the invention is to provide an ion exchange strip with which rapid quantitative trials of relative ion concentrations can be made, so that measurements such as the effective calcium ion concentration in blood serum can be carried out easily as compared with customary methods. Another object is to provide an ion exchange strip incorporating an indicator which undergoes colour change enabling the presence of any contaminant on the surface of the strip to be detected and/or the completeness of the ion exchange process to be seen, that is whether sufficient time has been allowed for the ion exchange.

Accordingly the present invention provides for a method for the determination of the concentration of microgram quantities of cations in solution by loading said cations on to an ion exchange strip which comprises a base strip of water-permeable β-cellulose film impregnated with a dye containing arylsulfonic groups which confer small ion exchange capacity to said strip, said dye being a self-indicating material which exhibits one color in the H-form and another in the M-form, i.e. hydrogen ion loading, and metal cation loading, washing the strip, discharging the loaded ions by replacement and determining the concentration of the discharge ions. The dye used preferably is Congo red which is blue in the H-form and red in the M-form.

The use of a water-permeable cellulose film results in the provision of a strip which retains the properties of the original cellulose so that said strip can be cleansed and washed without damage. The ion exchange involves only micrograms thus avoiding the upsetting of existing equilibria.

The use of Congo red allows sulphonic acid groups to be fairly firmly attached to the cellulose film without impairing the smoothness of the surface.

The film is a regenerated cellulose film such as is used in the packaging industry (cellulose viscose film). An example is PT 300 film made by British Cellophane Limited of Birmingham, England. I have found surprisingly, that utilising such base material, I can make an ion exchange strip fulfilling all of the objects set forth above.

In making ion exchange strips according to the invention, I prefer to take sheets of commercial water-permeable cellulose film which has a thickness of about 0.001–0.004 inch and to dye these, in a bath of 1:1 by volume water/propane-1,2-diol (propylene glycol) containing up to 0.5%, preferably 0.3% Congo red dye. The propane-1,2-diol serves as a non-toxic, non-flammable vehicle for achieving a high intensity of dyeing of the strip. The bath is maintained at a temperature of 80–85° C. for about 30 minutes. The water should be distilled or de-mineralised, and on removal of the sheets from the bath, these are water-washed and then converted, first with a few drops of concentrated hydrochloric acid to the blue form, then washed and next with a small excess of sodium bicarbonate to the sodium form. The sheets are then washed in several changes of distilled water of high purity or its equivalent and finally left in contact with $CO_2$ free low conductivity water until the dye ceases to leak into the water this being up to 48 hours.

The material is now dried at room temperature and cut up into strips of convenient size for example of 15 x 45 mms. Before use, the strips should preferably be tested for stability in distilled water. They can be stored in saline solutions (vide infra) in the dark.

Use of the ion-exchange strips depends largely on the fact that in solutions containing mixtures of ionized salts, the various cationic species will be attached to the strips in a manner determined by their relative concentrations or activities and also their valencies. On rapid transference to distilled water, the loaded ions are retained through washing until elutriation takes place. Two procedures for this are possible, depending on the ions under study.

In one procedure, strips may be treated with 2 ml. 0.05 N hydrochloric acid which replaces the loaded ions with hydrogen ions.

The originally loaded ions, now in solution, can be estimated by known methods such as flame photometry or compleximetric titrations where appropriate.

In the alternative procedure, when divalent ions such as calcium and magnesium are to be estimated by compleximetric titration only, a strong solution of electrolyte for example, 5% w./v. sodium chloride is used to replace the divalent ions completely and they can then be estimated in the saline.

Various steps in the haandling of the strips can be adopted. They can be numbered for identification by pricking through with a stout needle or perforating stamp.

For washing and elutriation, specimen tubes, for example, of ⅞ x 3 inches are suitable. Titration can be carried out directly in such tubes. Strips must not come into contact with human skin or metal objects, and glass rods and plastics covered forceps can be used for handling. $CO_2$-free water should be used for washing.

The novel features of this invention lie in its robust character which permits considerable freedom of manipulation to clean after use in dirty situations and to re-generate and re-use repeatedly. Readily accessibility of the exchange centres to ions in solution makes it easy to carry out rapid quantitative assays of relative ions concentrations. Thus, it is possible to perform on a routine basis measurements which previously were difficult, for example, the relative concentration of calcium in blood serum. The strips also have many applications in chemical analysis, particularly in the biological field.

Excessive rigidity of the film particularly of the thicker grades, may be avoided by carrying out the final washing of the sheets in a 5% w./v. aqueous propane-1,2-diol. The film when dried out, retains under normal humidity conditions, sufficient moisture to be reasonably pliable.

I claim:

1. A method for the determination of the concentration of microgram quantities of cations in solution by loading said cations on to a cation exchange strip comprising a base strip of a water-absorbent β-cellulose film impregnated with a dye containing arylsulphonic groups conferring small cation exchange capacity to said strip and which strip is self indicating being one color in the H-form and another color in the M-form, washing the strip, discharging the loaded cations by replacement and determining the concentration of the discharged cations.

2. Method as in claim 1, in which the dye is Congo red.

3. Method of making a cation exchange strip, which consists in immersing a sheet of a water permeable cellulose film in a bath containing water/propane-1, 2-diol and up to 5% w./v. Congo red, maintaining same at a temperature of between 80°–85° C. for 30 minutes, removing the said sheet and washing same, converting to blue color with hydrochloric acid washing, converting to red sodium form with a minimum of sodium bicarbonate solution, washing in distilled water of high purity, leaving to sand in $CO_2$-free low conductivity water until the dye ceases to leak, drying and then cutting into strips.

References Cited

UNITED STATES PATENTS 3,238,020  3/1966  Eiseman.
3,282,650  11/1966  Bannigan.

OTHER REFERENCES

George H. Richter, "Textbook of Organic Chem.," 3rd edition, p. 568, John Wiley and Sons, New York, 1952.

MORRIS O. WOLK, Primary Examiner

S. MARANTZ, Assistant Examiner

U.S. Cl. X.R.

23—230; 210—25, 38